Feb. 4, 1930.    W. B. RAYTON    1,745,641
OPHTHALMIC LENS
Filed March 24, 1927
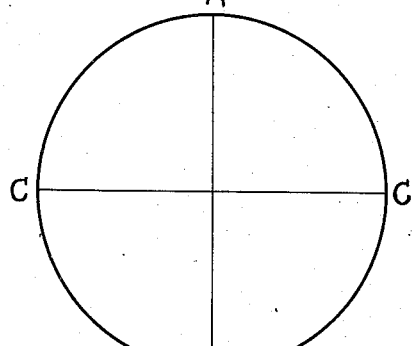
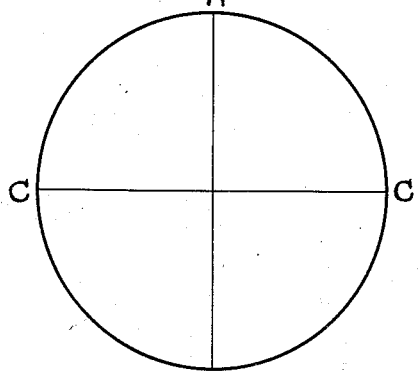
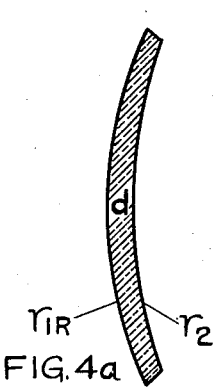
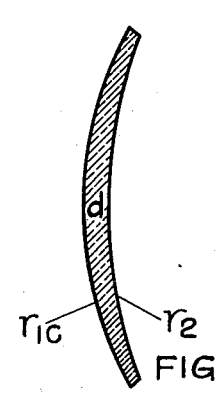
WILBUR B. RAYTON.
INVENTOR
By Cumpston & Griffith
his ATTORNEYS Patented Feb. 4, 1930

1,745,641

UNITED STATES PATENT OFFICE

WILBUR B. RAYTON, OF ROCHESTER, NEW YORK, ASSIGNOR TO BAUSCH AND LOMB OPTICAL COMPANY, OF ROCHESTER, NEW YORK, A CORPORATION OF NEW YORK

OPHTHALMIC LENS

Application filed March 24, 1927. Serial No. 177,849.

This invention relates to improvements in ophthalmic lenses which are designed to correct astigmatic errors of the eye or combinations of focal and astigmatic errors. More particularly, it has reference to an ophthalmic lens which is corrected for marginal astigmatism so that it is adapted equally well for near or distant vision.

One of the most important objects of the present invention is to provide an astigmatically corrected lens of universal application.

Another object is to produce an ophthalmic lens having an astigmatic correction which is calculated for an object located between normal reading distance and infinity.

Another object is to produce an ophthalmic lens which is substantially free from astigmatic error for an object located between normal reading distance and infinity whereby the astigmatic errors for near and distant vision are rendered substantially equivalent and negligible.

Other objects and advantages reside in certain novel features of construction, arrangement and combination of parts, which will hereinafter be more fully described and pointed out in the appended claims.

Referring to the drawings:

Fig. 1 shows a sectional view of a sphero lens corrected for astigmatism according to the prior art.

Fig. 2 shows a sectional view of a sphero lens which is corrected for astigmatism in accordance with the present invention.

Fig. 3 shows a face view of a sphero-cylinder lens corrected for astigmatism according to the prior art.

Fig. 3ª shows a section taken through the meridian R—R of the lens of Fig. 3.

Fig. 3ᵇ shows a section taken through the meridian C—C of the lens of Fig. 3.

Fig. 4 shows a face view of a sphero-cylinder lens of the same powers as the lens of Fig. 3 but corrected for astigmatism according to the present invention.

Fig. 4ª shows a section through the meridian R—R of the lens of Fig. 4.

Fig. 4ᵇ shows a section through the meridian C—C of the lens of Fig. 4.

Ophthalmic lenses may be broadly classified into two groups, the sphero and the sphero-cylinder, in which those of the first group are characterized by the fact that the lens surfaces are either plano or spherical while those of the second group have at least one surface ground in a cylindrical or toric form. My invention, to be hereinafter fully described, is equally applicable to lenses of either these two groups.

Oblique vision through a spectacle lens is accomplished by rotation of the eyeball about a center which lies between 25 and 30 millimeters back of the rear surface of the lens. The image of any object point viewed obliquely through the lens is, therefore, formed by a narrow beam of light, limited by the aperture of the pupil, whose axis or principal ray passes through the center of rotation of the eyeball. Under these conditions, the beam of light will not, in general, converge to a point image, but it will be astigmatic and form two separate focal lines which are perpendicular to each other. These two focal lines are known as the primary and secondary foci and are designated by "$t$" and "$s$", respectively.

In the case of a sphero-cylinder lens, the image of any object point is always astigmatic because of the presence of the cylinder element and two separate focal lines are formed perpendicular to each other. The effect of astigmatism due to the oblique passage of a pencil of light through the sphero-cylinder lens will be to increase or decrease the separation of the focal lines so that the lens no longer functions as required.

In the prior art it has been shown that, by a proper choice of curvatures, it is possible to correct a lens for astigmatism of oblique pencils by eliminating the astigmatism in the case of sphero lenses and by reducing the effect of the astigmatism to a minimum in the case of sphero-cylinder lenses. In the latter case, the condition which must be met is that the astigmatic difference between the two foci, $t$ and $s$, be practically equal at corresponding points in the two principal meridians of the lens. By corresponding points is meant points equidistant from the center of the lens, or points such that lines drawn therefrom to the center of rotation of the eyeball make equal angles with the optical axis of the lens.

In practice it has been found that the most satisfactory angle of obliquity for which to make the required astigmatic correction is 30°, i. e., the line of sight is assumed to be inclined 30° to the optical axis of the lens, and with this angle at each side of the axis, it corresponds to a total angular field of view of 60°.

When either of the above mentioned corrections for astigmatism is carried out completely for a lens with an object at a given distance, the lens is not properly corrected for any other object distance. Thus, if the lens is corrected for distant vision, it is more or less over-corrected for close work such as reading.

I have found, however, that it is possible to correct the astigmatism for an object plane which is located between a point at normal reading distance and a point at infinity. Under this condition the lens is slightly under-corrected for distant vision and slightly over-corrected for near vision. These errors, however, are small in comparison to the error due to the over-correction for reading distance which is present in a lens which has been strictly corrected for distant vision. In a lens corrected completely for distance, the residual over-correction at reading distance, while imperceptible because both images will lie within the range of accommodation, is fatiguing to the eye in continued application.

The accommodation of a normal, or emmetropic eye is entirely relaxed, i. e., equals 0.00 D, when it looks at an object located at infinity, defined as a distance of 20 feet or more. Normal reading distance is approximately 13 inches, and at this distance the accommodation of the emmetropic eye is about 3.00 D. The mean value of the accommodations required for distant and near vision is consequently 1.50 D, and with this accommodation the eye is properly focused for an object distance of 26 inches.

Hence, by correcting a lens for astigmatism for an intermediate object distance, of say 26 inches, for example, I am able to average the astigmatic errors for near and distant vision and provide a lens which, for universal application, is better adapted than any other lens of which I am aware. Thus the lens will be substantially completely corrected for astigmatism for an object distance of 26 inches while the astigmatic errors for near and distant vision will be substantially equal because of averaging and hence will be negligible in amount.

The application of my invention may be illustrated by a few cases which are by way of example only. In each of the following instances, the index of refraction for the glass is assumed to be 1.523 for wave length 5890 and the center of rotation of the eyeball is assumed to be 25–30 mm. behind the rear surface of the lens.

Fig. 1 shows a sphero lens corrected, according to the prior art, for astigmatism for distant vision, wherein $r_1 = +106.0$ mm.; $r_2 = -52.6$ mm.; $d = 0.6$ mm. and the power of the lens is $-5.0$ D. For object distance of infinity the astigmatic difference or amount of cylinder, $s - t = 0.00$ D; for object distance of 13 inches the astigmatic difference $t - s = 0.26$ D. Thus it will be seen that while this lens is completely corrected for astigmatism for an object at infinity, the astigmatic error for an object at 13 inches amounts to the rather substantial value of 0.26 D.

Fig. 2 shows a sphero lens, of the same power as the lens of Fig. 1, but corrected for astigmatism according to my invention, wherein $r_1 = +141.3$ mm.; $r_2 = -60.06$ mm.; $d = 0.6$ mm. and the power of the lens is $-5.0$ D. For object distance of 26 inches the astigmatic difference, $s - t = 0.00$ D; for object distance of 13 inches $t - s = 0.15$ D and for object distance of infinity $s - t = 0.15$ D. It will be noted that this lens is completely corrected for astigmatism for an object distance of 26 inches and that the astigmatic errors for near and distant vision are, in each case, comparatively small.

Figs. 3, 3$^a$, and 3$^b$, show a sphero-cylinder lens corrected for astigmatism according to the prior art, the front surface of the lens being of toric form while the rear surface is of spherical form. For this lens $r_{1R} = +66.73$ mm.; $r_{1C} = +59.30$ mm.; $r_2 = -75.50$ mm.; $d = 2.2$ mm. The powers are $+1.00$ D in the R—R meridian and $+2.00$ D in the C—C meridian, corresponding to an astigmatic difference of 1.00 D. For a 30° inclination of the line of sight, the difference in cylinder, or astigmatic error, between the corresponding points in the two principal meridians is equal to 0.00 D for object at infinity while for object at a distance of 13 inches the astigmatic error is 0.18 D.

Figs. 4, 4$^a$, and 4$^b$, show a sphero-cylinder lens, corrected for astigmatism according to my invention, the front surface of the lens being of toric form while the rear surface is of spherical form. For this lens $r_{1R} = +79.35$ mm.; $r_{1C} = +69.09$ mm.; $r_2 = -92.50$ mm. and $d = 2.2$ mm. The powers of the lens are the same as those of the lens of Fig. 3. For a 30° inclination of the line of sight, the difference in cylinder between corresponding points in the two principal meridians is equal to 0.09 D for object at infinity; 0.10 D for object at 13 inches and 0.00 D for object at approximately 26 inches. Thus it will be noted that with the lens completely corrected for object distance of 26 inches, the astigmatic errors for near and distant vision are averaged and rendered comparatively small in each instance.

While the magnitude of the effects becomes larger in lenses of greater power, the character is the same in all cases. The average performance of my improved lens, over the entire useful range of object distances from near to distant vision, is better than for a lens which is astigmatically corrected for an object distance at either end of the range.

The curvatures required to fulfill the specified conditions can be computed by methods and formulas which are set forth in standard text books on optics. It will be found that my improved lens possesses distinct advantages as regards manufacture since the curvatures required are not so great as those required for a lens which is astigmatically corrected for distant vision. My invention is applicable to both the sphero and the spherocylinder types of ophthalmic lenses. It is to be understood that my invention is not limited to an object distance of 26 inches, as this distance is given by way of illustration only.

From the foregoing, it will be apparent that I am able to attain the objects of my invention and provide an astigmatically corrected ophthalmic lens adapted for universal use. The specification and accompanying drawings are to be interpreted as illustrative only, and not in any limiting sense.

I claim:

1. An ophthalmic lens having curved surfaces which cooperate to substantially eliminate astigmatic errors of oblique pencils of light which proceed from an object located at a distance from the lens which is greater than normal reading distance and less than infinity, the amounts of astigmatism for objects at infinity and reading distance being averaged so that lens is adapted for both near and distant vision.

2. An ophthalmic lens having curved surfaces which cooperate to effect a substantially complete correction of the astigmatic errors of oblique pencils of light coming from an object located between a point at normal reading distance and a point at infinity, the amounts of astigmatism for objects at infinity and reading distances being substantially equal.

3. An ophthalmic lens which is corrected for astigmatism for an object distance of substantially 26 inches, whereby the astigmatic errors for normal reading distance and infinity are averaged and rendered negligible and the lens is adapted equally well for near and distant vision.

WILBUR B. RAYTON.